(12) United States Patent
Nagai et al.

(10) Patent No.: US 7,023,180 B2
(45) Date of Patent: *Apr. 4, 2006

(54) CHARGING APPARATUS AND METHOD FOR A SECONDARY BATTERY OF A PORTABLY ELECTRONIC DEVICE

(75) Inventors: Tamiji Nagai, Kanagawa (JP); Kazuo Yamazaki, Kanagawa (JP); Tadahisa Yamamoto, Kanagawa (JP)

(73) Assignee: Sony Corporation, (JP)

( * ) Notice: Subject to any disclaimer, the term of this patent is extended or adjusted under 35 U.S.C. 154(b) by 103 days.

This patent is subject to a terminal disclaimer.

(21) Appl. No.: 11/102,838

(22) Filed: Apr. 11, 2005

(65) Prior Publication Data

US 2005/0189926 A1    Sep. 1, 2005

Related U.S. Application Data

(63) Continuation of application No. 10/426,661, filed on May 1, 2003.

(30) Foreign Application Priority Data

May 15, 2002  (JP) .......................... P2002-139661

(51) Int. Cl.
*H01M 10/46* (2006.01)
(52) U.S. Cl. ..................................... 320/162
(58) Field of Classification Search ................ 320/125, 320/152, 157, 160, 162, 163, 164, 134, 136; 307/64, 66
See application file for complete search history.

(56) References Cited

U.S. PATENT DOCUMENTS

| 5,384,837 A | 1/1995 | Fox |
| 5,969,506 A | 10/1999 | Neal |

*Primary Examiner*—Edward H. Tso
(74) *Attorney, Agent, or Firm*—Rader, Fishman & Grauer PLLC; Ronald P. Kananen

(57) ABSTRACT

In the case of charging by a charging apparatus having a plurality of input terminals to which external power sources for charging a secondary battery are inputted, it is prevented that a current of the inputted power source is outputted to the outside from the other input terminals for charging which are not used. If there are inputs from a plurality of input terminals, the input power sources are controlled so that the battery is optimally charged. pnp-type transistors Q1 and Q2 are arranged between two input terminals of a terminal 11 for an external power adaptor and a terminal 12 for a holder and a secondary battery E1, respectively. When a control IC 13 detects an input power voltage of one of the transistors, the transistor on the detected side is turned on. If the control IC 13 detects both input power voltages, a priority is allocated under predetermined conditions and the secondary battery E1 is charged by the power source of the higher priority.

1 Claim, 11 Drawing Sheets

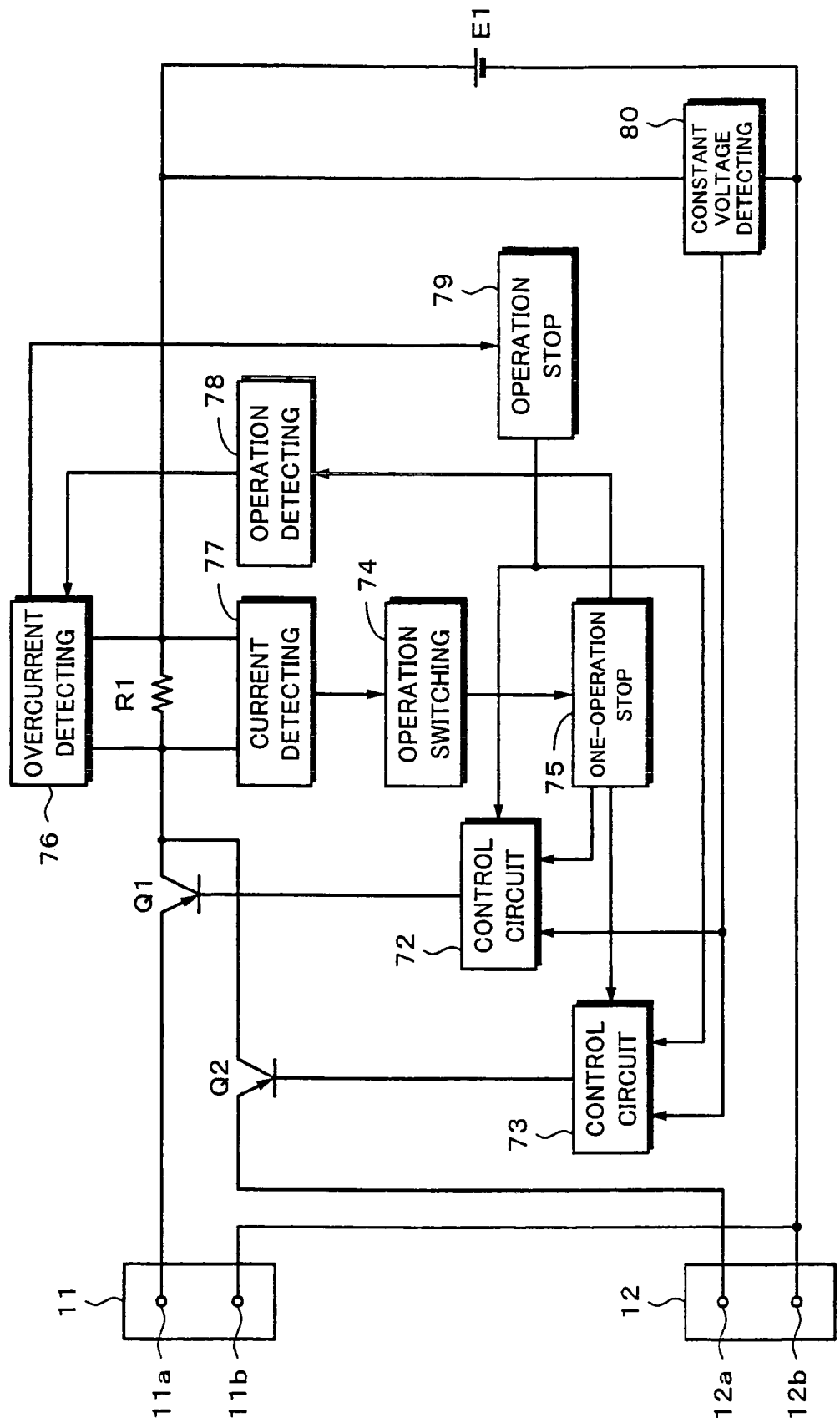

CHARGING APPARATUS AND METHOD FOR A SECONDARY BATTERY OF A PORTABLY ELECTRONIC DEVICE

RELATED APPLICATION

This application is a continuation of U.S. patent application Ser. No. 10/426,661 filed on May 1, 2003 which is hereby incorporated in its entirety by reference.

BACKGROUND OF THE INVENTION

1. Field of the Invention

The invention relates to a charging apparatus and a charging method. More particularly, the invention is suitable when it is applied to a charging apparatus and a charging method of a secondary battery of a cellular phone or the like having two or more input terminals for charging.

2. Description of the Related Arts

A primary battery such as a dry battery, and a secondary battery, such as nickel-cadmium battery, nickel-hydrogen battery, or lithium-ion battery, or the like, are used as a power source of a portable electronic apparatus. Even if the secondary battery is dead, the battery can be repetitively used by being charged. However, it is very tiring that each time the battery is dead, the user removes the secondary battery from the portable electronic apparatus and charges it by a charger. Therefore, a cellular phone or the like has a structure such that it can be charged in a state where the secondary battery is held in the main body.

As a method of charging the cellular phone in a state where the secondary battery is held in the main body, for example, there is a method whereby a home-use, commercially available, AC power source is used as an external power source, and the charge is performed by using an AC adaptor or a method whereby a battery of an automobile is used as an external power source and the charge is performed via a cigarette socket, a vehicle-mounted adaptor, or the like. Among recent portable electronic apparatuses, there is an apparatus having a socket into which a terminal of the adaptor for each of those external power sources is directly inserted and the charge is performed. Further, there is an apparatus, such as cellular phone, MD (mini disc) player, or the like, such that merely by putting it onto a holder connected to the adaptor for the external power source, the charge can be performed.

The ordinary cellular phone has two charging terminals, such as a charging terminal for the holder and a charging terminal for the adaptor, so that in a use location, such as a home or the like, importance is attached to the easiness of the charging operation and the charge can be performed via the holder connected to the adaptor for the external power source, and in a mobile location, such as outdoor, room in an automobile, or the like, importance is attached to the easiness of carrying and the charge can be performed only by the adaptor for the external power source. In order to make the apparatus cope with such a plurality of charging methods, by providing a plurality of charging input terminals for the portable electronic apparatus, the user can easily charge it.

A charging apparatus of such a conventional, portable electronic apparatus having a plurality of charging terminals will now be described. FIG. 1 is a diagram showing an example of a conventional charging circuit of a cellular phone. The charging circuit is constructed of: a terminal 101 for an external power adaptor; a terminal 102 for a holder; diodes D101 and D102; a pnp-type transistor Q101; resistors R101 and R102; a control IC 103; and a secondary battery E101.

The terminal 101 for the external power adaptor is an input terminal for directly connecting a connecting terminal of the adaptor for the external power source and inputting a DC power source converted by the external power adaptor. The terminal 101 for the external power adaptor comprises a terminal 101a of a plus (+) electrode and a terminal 101b of a minus (−) electrode. The terminal 102 for the holder is an input terminal for connecting to a terminal of the holder to which the adaptor for the external power source has been connected and inputting a DC power source converted by the adaptor for the external power source via the holder. The terminal 102 for the holder comprises a terminal 102a of a plus electrode and a terminal 102b of a minus electrode. The secondary battery E101 is a battery, such as lithium-ion battery, nickel-hydrogen battery, or the like, of what is called a cellular phone.

The terminal 101a is connected via the diode D101 and the terminal 102a is connected via the diode D102 to an input electrode, that is, an emitter of the pnp-type transistor Q101, and the control IC 103, respectively. An output electrode, that is, a collector of the pnp-type transistor Q101, is connected to a plus side of the secondary battery E101 via the resistor R101. Both ends of the resistor R101 are connected to the control IC 103. Further, a control electrode, that is, a base of the pnp-type transistor Q101, is connected to the control IC 103 via the resistor R102. A. minus side of the secondary battery E101 and a part of the control IC 103 are connected to the terminals 101b and 102b.

In the charging circuit, if a current of an external power voltage is inputted from the terminal 101a, the diode D101 is turned on by a forward bias, so that the current of the power voltage is supplied to the pnp-type transistor Q101 and the control IC 103. When the control IC 103 detects the voltage as mentioned above, the current is supplied to the base of the pnp-type transistor Q101 via the resistor R101 under control of the control IC 103. Thus, the pnp-type transistor Q101 is turned on, a portion between the emitter and the collector of the pnp-type transistor Q101 is made conductive, and the secondary battery E101 is charged via the resistor R101.

If the current of the external power voltage is inputted from the terminal 102a, the diode D102 is turned on by a forward bias, so that the current of the power voltage is supplied to the pnp-type transistor Q101 and the control IC 103. When the control IC 103 detects the voltage as mentioned above, the current is supplied to the base of the pnp-type transistor Q101 via the resistor R101 under the control of the control IC 103. Thus, the pnp-type transistor Q101 is turned on, the portion between the emitter and the collector of the pnp-type transistor Q101 is made conductive, and the secondary battery E101 is charged via the resistor 101.

In the case of charging by the charging circuit, a constant voltage, a constant current, or the like to the secondary battery E101 is measured and the charging circuit is controlled by the control IC 103 so that the charge is performed by a desired voltage or current. For example, if a full charge is detected, the control IC 103 stops the current supply to the base of the pnp-type transistor Q101 and stops the charge.

As mentioned above, in the charging circuit shown in FIG. 1, when the current of the external power voltage is inputted from the terminal 101a, the diode D101 is turned on by the forward bias and the current of the power voltage is supplied to the pnp-type transistor Q101 and the control IC 103. At this time, since a backward bias is applied in the diode D102, the diode D102 is turned off and the current is hardly supplied to the terminal 102a. Similarly, when the current of the external power voltage is inputted from the terminal 102a, the diode D102 is turned on by the forward bias and the current of the power voltage is supplied to the pnp-type transistor Q101 and the control IC 103. At this time, since a backward bias is applied in the diode D101, the diode D101 is turned off and the current is hardly supplied to the terminal 101a.

That is, a situation such that when the external power source is inputted from one of the input terminals for charging, it is outputted from the other input terminal for charging is prevented by using unilaterality of the diode.

However, the foregoing conventional charging apparatus and charging method have the following problems. FIGS. 2A and 2B are diagrams showing an example for explaining a voltage and a current between a diode and a transistor.

FIG. 2A is a diagram regarding the voltage, and FIG. 2B is a diagram regarding the current. As shown in FIG. 2A, when a voltage that is obtained after the output from the diode is assumed to be Vq and a voltage that is inputted to the diode D101 is assumed to be Vd1, it is necessary to set Vd1 to be higher than Vq in order to obtain a predetermined voltage Vq. Similarly, when a voltage that is inputted to the diode D102 is assumed to be Vd2, it is necessary to set Vd2 to be higher than Vq in order to obtain the predetermined voltage Vq. This is because a voltage drop (drop voltage) is caused by the diode.

Therefore, the diode is used so that the power voltage inputted to the charging circuit is not outputted from the other input terminal for charging, and in order to obtain the predetermined voltage, it is necessary that the input voltage to the diode is set to be higher by the drop voltage. There is, consequently, a problem such that the efficiency of the charging circuit deteriorates.

As shown in FIG. 2B, when the power voltage is inputted to both of the diodes D101 and D102, when a current flowing in the diode D101 is assumed to be Id1 and a current flowing in the diode D102 is assumed to be Id2, a merged current Iq is equal to Iq=Id1+Id2 (a base current of the transistor Q101 serving as an operation current is ignored).

Therefore, when the power voltages are simultaneously inputted to the charging circuit from a plurality of charging terminals, since power source currents also flow from a plurality of charging terminals, an overcurrent flows to the secondary battery and the charging circuit and an adverse influence is exerted thereto. There is a problem that there is a possibility of deterioration in safety of the charging apparatus.

OBJECTS AND SUMMARY OF THE INVENTION

In a charging apparatus having a plurality of input terminals that are used for charging, therefore, it is an object of the invention to provide a charging apparatus and a method in which safety is assured and efficiency is high.

To accomplish the above object, according to the first aspect of the invention, there is provided a charging apparatus comprising:

first and second input terminals to which power voltage sources are connected;

first and second semiconductor devices for power control in which the first and second input terminals are connected to input electrodes, respectively;

a secondary battery to which output electrodes of the first and second semiconductor devices for power control are connected in common and that is connected between the common connection electric potential point and a reference electric potential point;

a control circuit for controlling a terminal voltage and a charge current of the secondary battery to desired values; and switching signal generating means for detecting voltages that are generated at the input electrodes of the first and second semiconductor devices for power control and generating a switching signal for turning on a circuit between the input and output electrodes of the semiconductor device for power control at which the voltage has been detected.

According to the invention, the semiconductor devices for power control are respectively provided between the first and second input terminals and the secondary battery, the voltage generated at each input electrode of the semiconductor devices for power control is detected, and the on/off states of the circuit between the input and output electrodes of the semiconductor device for power control are switched in accordance with a detection result, so that while the flow of current from the input terminal to which no power source is inputted is prevented, the switching of power sources with high safety and high efficiency can be realized.

The above and other objects and features of the present invention will become apparent from the following detailed description and the appended claims with reference to the accompanying drawings.

BRIEF DESCRIPTION OF THE DRAWINGS

FIG. 11 is a block diagram showing an example of a charging circuit according to the seventh embodiment of the invention.

DETAILED DESCRIPTION OF THE PREFERRED EMBODIMENTS

Figure 1:
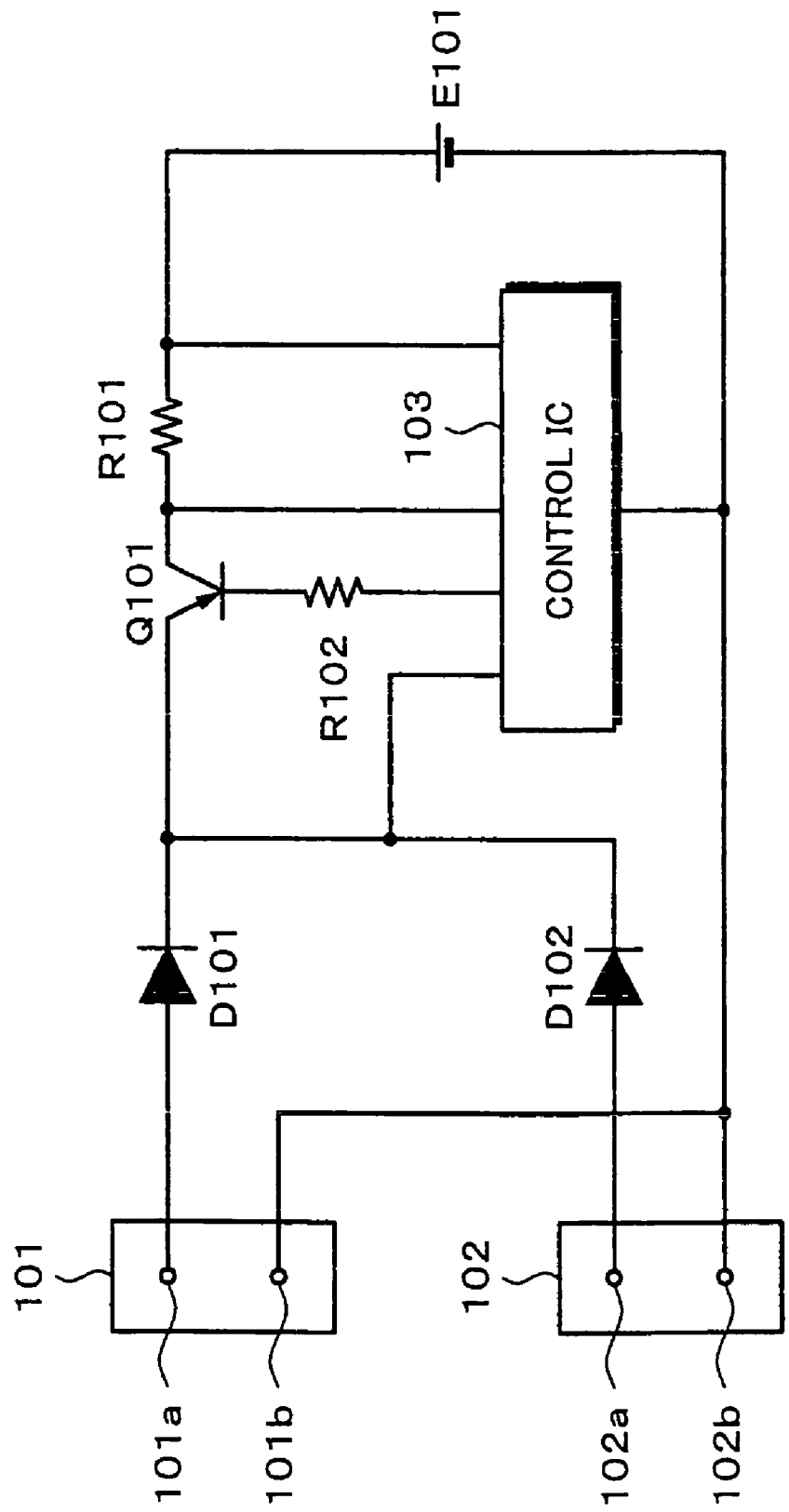
FIG. 1 is a block diagram showing an example of a charging circuit of a conventional cellular phone.
Figure 2A:
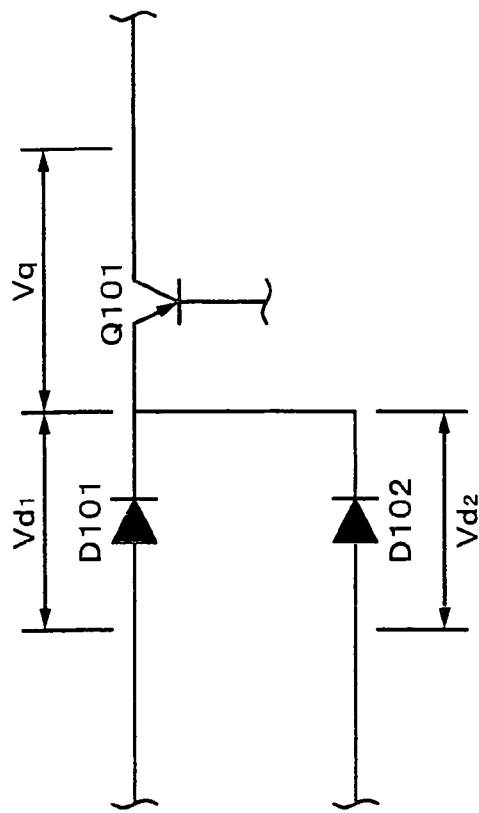
FIGS. 2A and 2B are diagrams showing an example for explaining a voltage and a current between a diode and a transistor in the charging circuit of the conventional cellular phone.
Figure 2B:
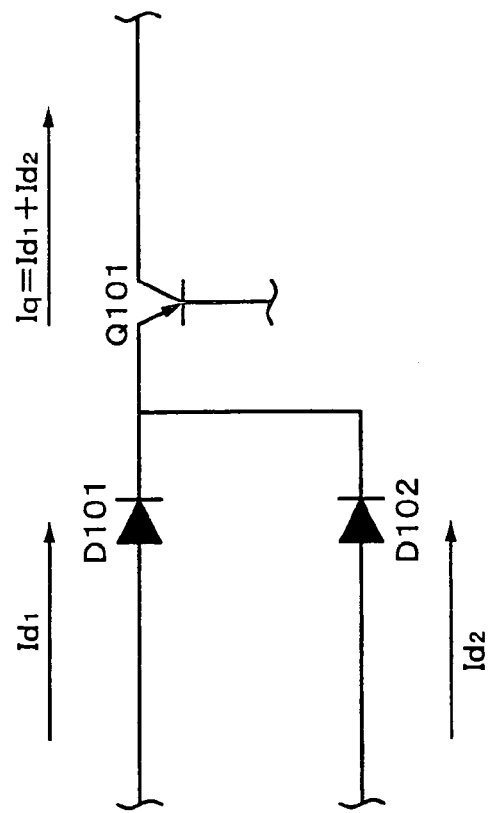
Figure 3A:
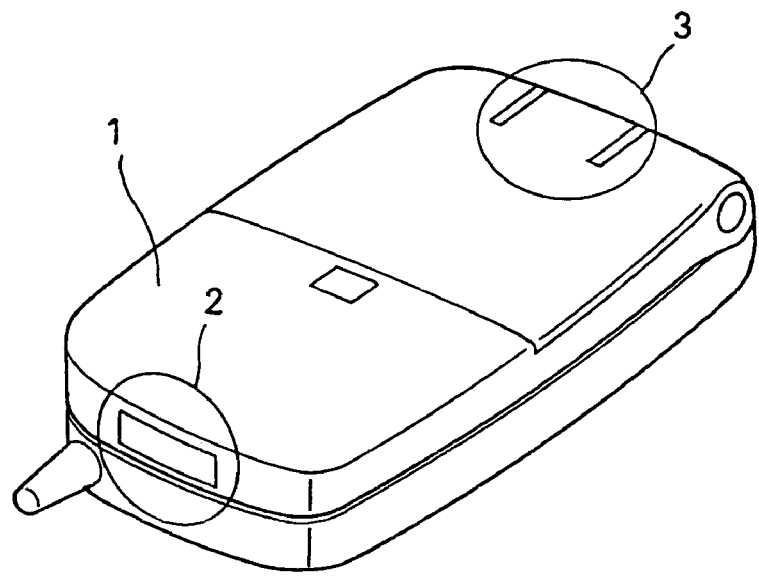
FIGS. 3A to 3C are schematic diagrams showing an example of a cellular phone having two input terminals of an external power source for charging.
Figure 3B:
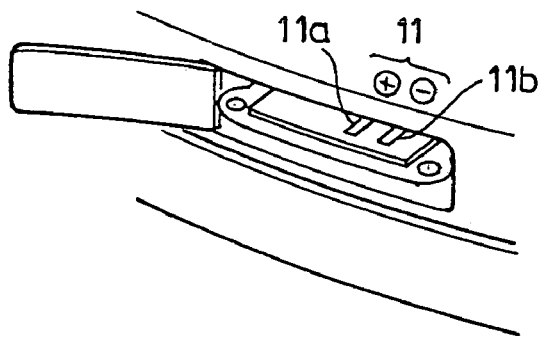
Figure 3C:
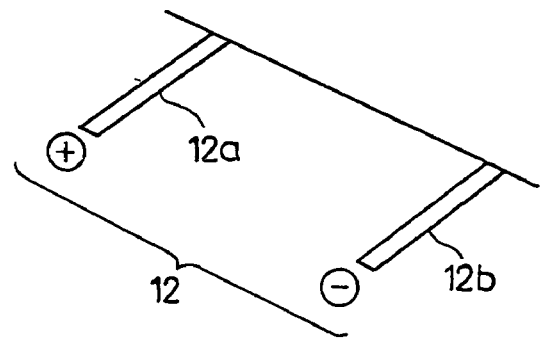

First, a portable electronic apparatus to which the invention is applied will be described with reference to the drawings. FIGS. 3A to 3C show an example of a cellular phone having two input terminals of external power sources for charging. A cellular phone 1 shown in FIG. 3A is what is called a folding cellular phone and has: a connector 2 to which a connecting terminal of an external power adaptor, such as an AC adaptor, or the like is directly connected and through which a battery in the cellular phone can be charged; and a terminal portion 3 through which the battery in the cellular phone can be charged from the external power adaptor via a holder 5 (refer to FIG. 4B). FIG. 3B shows an enlarged diagram of the connector 2. FIG. 3C shows an enlarged diagram of the terminal portion 3.

The connector 2 shown in FIG. 3B is a connector for an external interface of the cellular phone 1 and has a terminal 11a of a plus (+) electrode and a terminal 11b of a minus (−) electrode serving as power terminals. In the embodiment, the terminals 11a and 11b are referred to as a terminal 11 for the external power adaptor. By connecting the connecting terminal of the external power adaptor, for example, the AC adaptor, to the connector 2, a secondary battery provided for the cellular phone 1 can be charged.

The terminal portion 3 shown in FIG. 3C has a terminal 12a of a plus (+) electrode and a terminal 12b of a minus (−) electrode through which the secondary battery can be charged from the external power source via the holder. It is assumed that the terminals 12a and 12b are referred to as a terminal 12 for the holder. By putting the cellular phone 1 onto the holder so that the terminal 12 for the holder comes into contact with a terminal provided for the holder, the secondary battery provided for the cellular phone 1 can be charged.

Figure 4A:
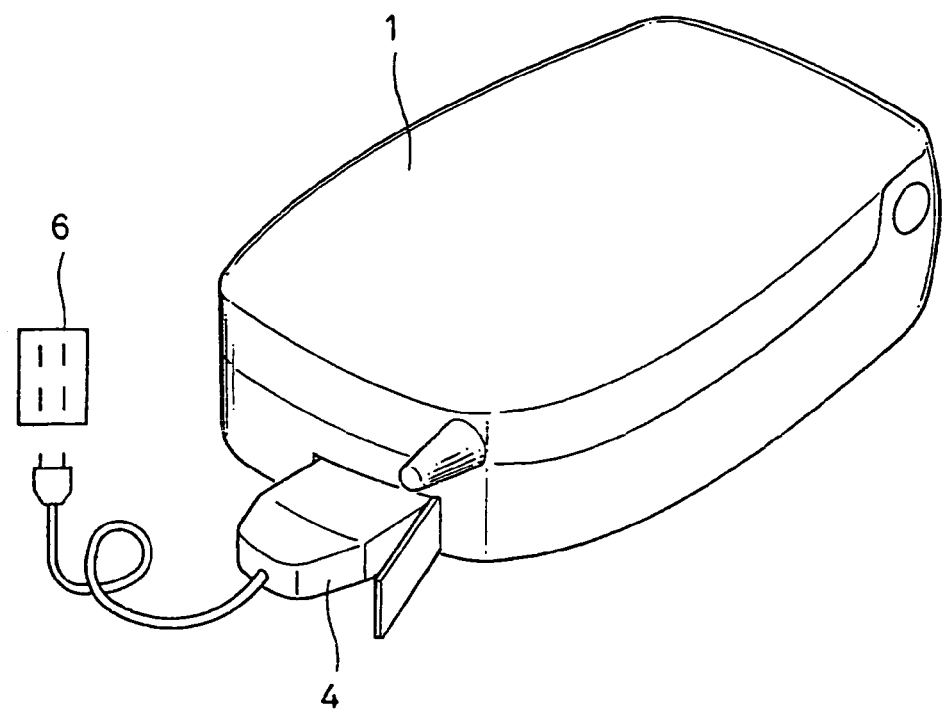
FIGS. 4A and 4B are schematic diagrams of an example showing a charging state of the cellular phone.
Figure 4B:
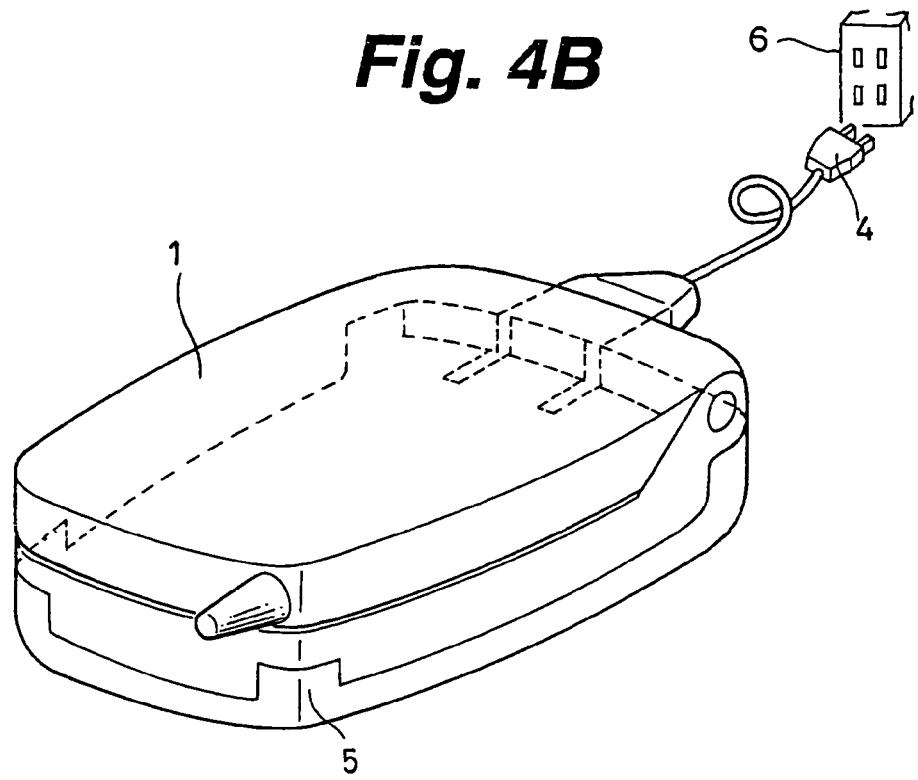

FIGS. 4A and 4B are diagrams of an example showing a charging state of the cellular phone. FIG. 4A is a diagram showing a state where an AC adaptor 4 is connected to the cellular phone and the battery is being charged. FIG. 4B is a diagram showing a state where the battery is being charged by using the holder 5.

That is, in the charge shown in FIG. 4A, by connecting the AC adaptor 4 to the connector 2 of the cellular phone 1 and inserting an electric plug of the AC adaptor 4 into an outlet 6, a predetermined DC power source is inputted from the terminal 11 for the external power adaptor into a charging circuit in the cellular phone 1. In the charge shown in FIG. 4B, by putting the cellular phone 1 onto the holder 5 so that the terminal 12 for the holder 1 comes into contact with the terminal provided for the holder 5 and inserting the electric plug of the AC adaptor 4 connected to the holder 5 into the outlet 6, a predetermined DC power source is inputted into the charging circuit in the cellular phone 1 via the terminal 12 for the holder. Although the explanation has been made here on the assumption that a home-use, commercially available power source is used as an external power source, a battery of an automobile or the like also can be used.

The charging apparatus according to the invention can be applied to the electronic apparatus having a plurality of external power input terminals for charging as described above. The embodiment of the invention will be described hereinbelow. First, the charging apparatus according to the first embodiment of the invention will be described.

Figure 5:
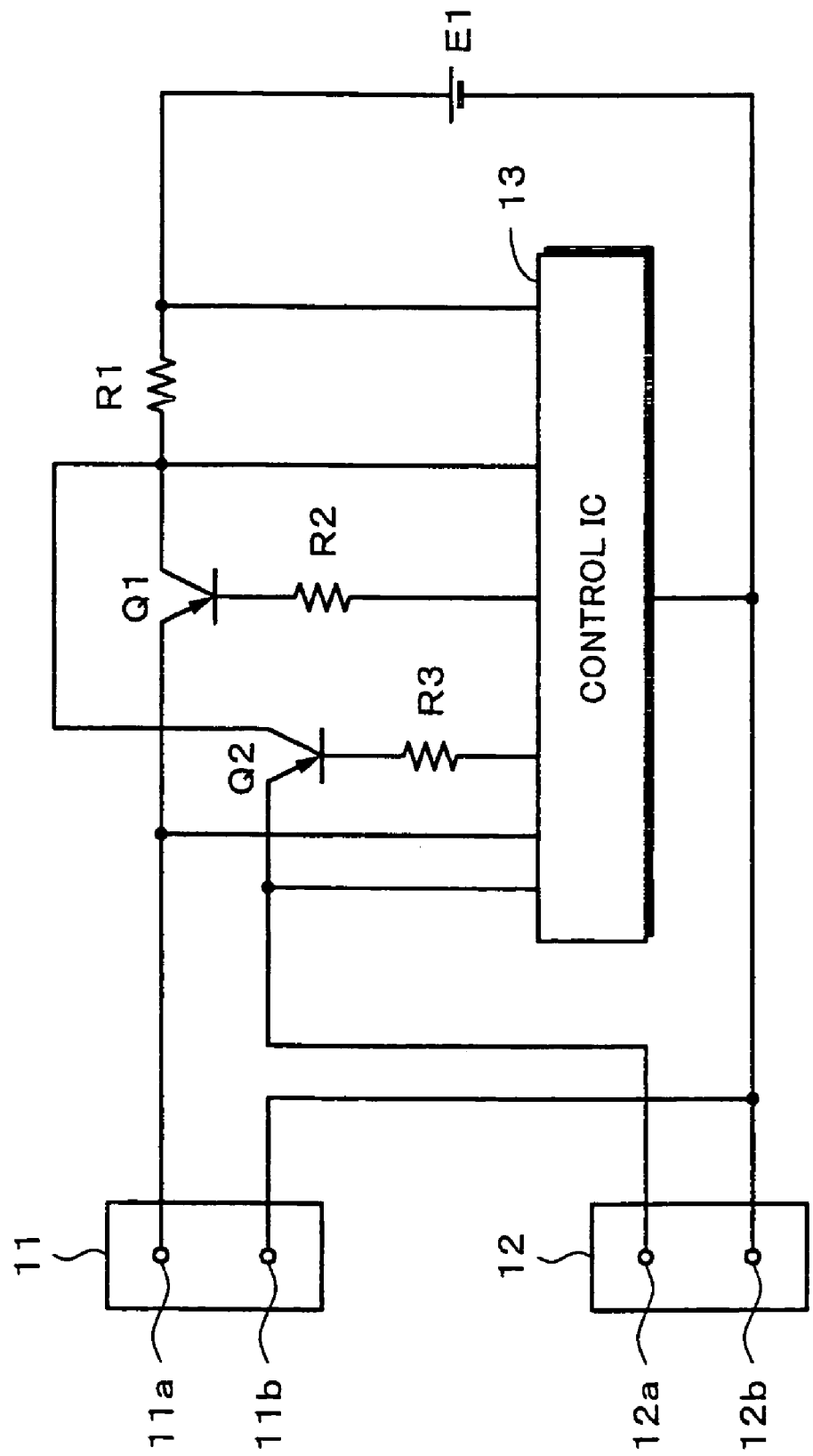
FIG. 5 is a block diagram showing an example of a charging circuit according to the first embodiment of the invention.

FIG. 5 is a diagram showing an example of a charging circuit according to the first embodiment of the invention. The charging circuit according to the first embodiment is constructed of: the terminal 11 for the external power adaptor; the terminal 12 for the holder; pnp-type transistors Q1 and Q2; resistors R1, R2, and R3; a control IC 13; and a secondary battery E1.

As described above with reference to FIGS. 3A–3C, the terminal 11 for the external power adaptor is an input terminal to which the connecting terminal of the external power adaptor such as an AC adaptor 4 or the like is directly connected and through which a predetermined DC power source converted by the adaptor for the external power source is inputted. The terminal 11 is constructed by the terminal 11a of the plus electrode and the terminal 11b of the minus electrode. The terminal 12 for the holder is an input terminal that comes into contact with the terminal provided for the holder 5 to which the external power adaptor has been connected and through which the predetermined DC power source converted by the adaptor for the external power source is inputted via the holder. The terminal 12 is constructed by the terminal 12a of the plus electrode and the terminal 12b of the minus electrode.

The secondary battery E1 is a secondary battery, such as lithium-ion battery, nickel-hydrogen battery, or the like, which is used as a battery of what is called a cellular phone. In the charging circuit, the pnp-type transistors Q1 and Q2 performs a switching operation of the external power source that is inputted and control the voltage and the current. The control IC 13 detects a charging voltage, a charging current, or the like, controls the pnp-type transistors Q1 and Q2, and makes other controls of the charging circuit.

In the charging circuit, the terminal 11a is connected to an input electrode, that is, an emitter of the pnp-type transistor Q1, and the control IC 13. The terminal 12a is connected to an input electrode, that is, an emitter of the pnp-type transistor Q2, and the control IC 13. Output electrodes, that is, collectors of the pnp-type transistors Q1 and Q2, are connected to a plus side of the secondary battery E1 via the resistor R1. Both ends of the resistor R1 are connected to the control IC 13. A control electrode, that is, a base of the pnp-type transistor Q1, is connected to the control IC 13 via the resistor R2. A control electrode, that is, a base of the pnp-type transistor Q2, is connected to the control IC 13 via the resistor R3. A minus side of the secondary battery and a part of the control IC 13 are connected to the terminals 11b and 12b, respectively.

Subsequently, in the charging circuit according to the first embodiment constructed as mentioned above, the operation in the case where the battery is charged from the input terminal of one of the terminal 11 for the external power adaptor and the terminal 12 for the holder upon charging will be described.

In the charging circuit according to the first embodiment, in the case of charging by using the terminal 11 for the external power adaptor, the current of the external power voltage is inputted from the terminal 11a. The inputted current of the external power voltage is inputted to the emitter of the pnp-type transistor Q1 and the control IC 13. Thus, the control IC 13 detects the power voltage at the emitter of the pnp-type transistor Q1, that is, in the input electrode portion. When the power voltage is detected, the control IC 13 supplies the current to the base of the pnp-type transistor Q1 via the resistor R2. Thus, the pnp-type transistor Q1 is turned on, a circuit between the emitter and the collector of the pnp-type transistor Q1 is made conductive, and the secondary battery E1 is charged via the resistor R1.

In the case of charging by using the terminal 12 for the holder, the current of the external power voltage is inputted from the terminal 12a. The inputted current of the external power voltage is inputted to the emitter of the pnp-type transistor Q2 and the control IC 13. Thus, the control IC 13 detects the power voltage at the emitter of the pnp-type transistor Q2, that is, in the input electrode portion. When the power voltage is detected, the control IC 13 supplies the current to the base of the pnp-type transistor Q2 via the resistor R3. Thus, the pnp-type transistor Q2 is turned on, a circuit between the emitter and the collector of the pnp-type transistor Q2 is made conductive, and the secondary battery E1 is charged via the resistor R1.

In the case of charging by the charging circuit according to the first embodiment, a constant voltage, a constant current, and the like to the secondary battery E1 are measured and the apparatus is controlled by the control IC 13 so that the battery is charged by desired voltage and current. If a full charge is detected, the control IC 13 stops the current supply to the bases of the pnp-type transistors Q1 and Q2 and completes the charge. In the case of charging, the power voltage that is inputted from the terminal 11 for the external power adaptor or the terminal 12 for the holder is set to be higher than the voltage of the secondary battery to be charged.

In the charging circuit according to the first embodiment, when the battery is charged from the input terminal of one of the terminal 11 for the external power adaptor and the terminal 12 for the holder, the transistor connected to the input terminal to which the external power source is inputted is turned on and the transistor connected to the other input terminal is turned off. However, there is also a case where both of the terminal 11 for the external power adaptor and the terminal 12 for the holder are connected. In such a case, the control IC 13 controls the input power sources on the basis of predetermined conditions. The case of inputting the power sources from both of the input terminals for charging will be described in conjunction with the subsequent second to seventh embodiments.

As described above, in the charging circuit according to the first embodiment, in the case of charging by using the terminal 11 for the external power adaptor, the pnp-type transistor Q1 is turned on, the circuit between the emitter and the collector of the pnp-type transistor Q1 is made conductive, and the current of the power voltage is inputted to the resistor R1 and the collector of the pnp-type transistor Q2. At this time, since no base current flows in the pnp-type transistor Q2, the pnp-type transistor Q2 is turned off. Since the voltage that is inputted to the pnp-type transistor Q2 is also the backward voltage, it is possible to prevent the current from flowing to the terminal 12a.

Similarly, in the case of charging by using the terminal 12 for the holder, the pnp-type transistor Q2 is turned on, the circuit between the emitter and the collector of the pnp-type transistor Q2 is made conductive, and the current of the power voltage is inputted to the resistor R1 and the collector of the pnp-type transistor Q1. At this time, since no base current flows in the pnp-type transistor Q1, the pnp-type transistor Q1 is turned off. Since the voltage that is inputted to the pnp-type transistor Q1 is also the backward voltage, it is possible to prevent the current from flowing to the terminal 11a.

Since the transistor is used as a semiconductor device for preventing the current from the input terminal for charging from being outputted from the other input terminal for charging, the voltage drop is smaller than that in the case of using a diode. Therefore, loss of voltage in the charging circuit can be reduced and charging efficiency is improved.

In the case of charging by using the terminal 11 for the external power adaptor and the terminal 12 for the holder, control such that the charge is selectively executed from only one of the external power sources on the basis of predetermined conditions can be made by the control IC 13 or the like. Therefore, heat generation or the like due to the overcurrent upon charging can be prevented and the safety of the charging circuit and the electronic apparatus having the charging circuit can be improved.

Subsequently, a charging apparatus according to the second embodiment of the invention will be described. The second embodiment relates to a charging circuit for selecting the input power source by a switching signal. In the second embodiment, it is assumed that the external power source is inputted from one of the two input terminals for charging. The case where the power sources are inputted from both of the input terminals will be explained in the third and subsequent embodiments.

Figure 6:
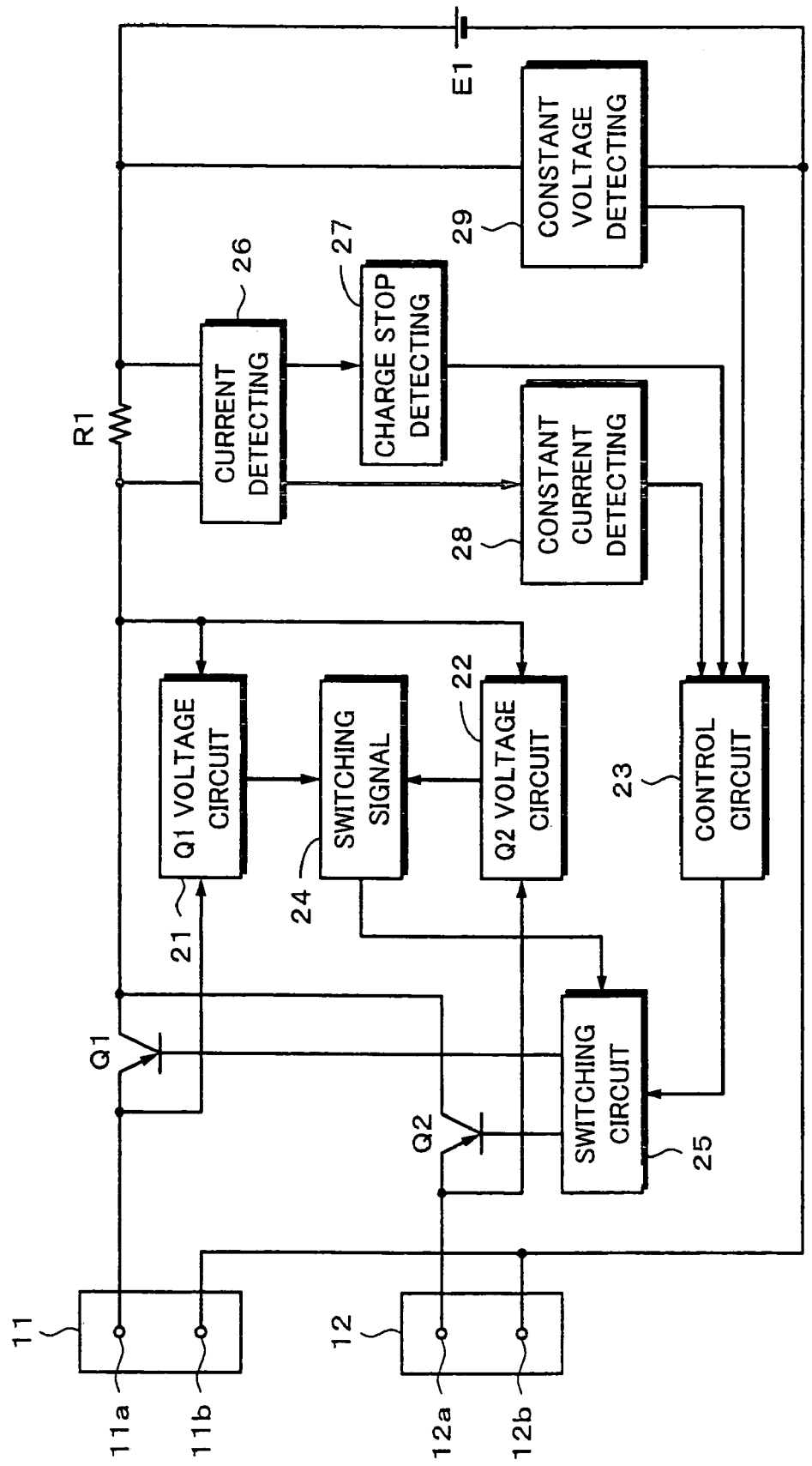
FIG. 6 is a block diagram showing an example of a charging circuit according to the second embodiment of the invention.

FIG. 6 is a diagram showing an example of the charging circuit according to the second embodiment of the invention. The fundamental construction of the charging circuit is the same as that shown in FIG. 5 and described in the first embodiment. That is, the terminal 11a is connected to the emitter of the pnp-type transistor Q1. The terminal 12a is connected to the emitter of the pnp-type transistor Q2. The collectors of the pnp-type transistors Q1 and Q2 are connected to the plus side of the secondary battery E1 via the resistor R1. The minus side of the secondary battery is connected to the terminals 11b and 12b, respectively. Also, in the third to seventh embodiments, which will be explained below, since their fundamental constructions are similar to that mentioned above, an explanation of those constructions is omitted in the subsequent embodiments.

Other portions, that is, a control circuit for the pnp-type transistors Q1 and Q2, are constructed as follows. A Q1 voltage detecting circuit 21 is connected to both ends on the emitter side and the collector side of the pnp-type transistor Q1 and is a circuit which can detect the voltage of the power source that is inputted from those ends to the pnp-type transistor Q1. A Q2 voltage detecting circuit 22 is connected to both ends on the emitter side and the collector side of the pnp-type transistor Q2 and is a circuit which can detect the voltage of the power source which is inputted from those ends to the pnp-type transistor Q2.

The Q1 voltage detecting circuit 21 and the Q2 voltage detecting circuit 22 are connected to a switching signal generating circuit 24. The switching signal generating circuit 24 is a circuit for generating a switching signal on the basis of detection results of the Q1 voltage detecting circuit 21 and the Q2 voltage detecting circuit 22. The switching signal generating circuit 24 is connected to a switching circuit 25.

The switching circuit 25 is connected to the bases of the pnp-type transistors Q1 and Q2 and is a circuit for supplying base currents to the pnp-type transistors Q1 and Q2 and switching the on/off operations of the pnp-type transistors Q1 and Q2 on the basis of the switching signal that is sent from the switching signal generating circuit 24.

A current detecting circuit 26, a charge stop detecting circuit 27, a constant current detecting circuit 28, and a constant voltage detecting circuit 29 construct what is called a charge power stabilizing circuit of the charging circuit. The charge power stabilizing circuit always operates during the charging operation and monitors the charge power. The current detecting circuit 26 is connected to both ends of the resistor R1 and is a circuit for detecting a current at those ends. The current detecting circuit 26 is connected to the constant current detecting circuit 28 and the charge stop detecting circuit 27.

The constant current detecting circuit 28 is a circuit for detecting the constant current from the current detected by the current detecting circuit 26. The charge stop detecting circuit 27 is a circuit for detecting the charge stop due to a full charge or the like of the secondary battery E1 from the current detected by the current detecting circuit 26. The constant voltage detecting circuit 29 is a circuit for detecting the constant voltage from both ends of the secondary battery E1. The constant current detecting circuit 28, the charge stop detecting circuit 27, and the constant voltage detecting circuit 29 are connected to a control circuit 23.

The control circuit 23 is a circuit for controlling the power source that is inputted so as to be the value that is optimum to charge the secondary battery on the basis of detection results that are sent from the constant current detecting circuit 28, charge stop detecting circuit 27, constant voltage detecting circuit 29, and the like and generating a control signal in the case where the charge voltage or current is equal to a value other than a specified value or the secondary battery E1 has been fully charged. The control circuit 23 is connected to the switching circuit 25 mentioned above. The switching circuit 25 is a circuit for also switching the on/off operations of the pnp-type transistors Q1 and Q2 corresponding to the control signal when the control signal is received from the control circuit 23.

Subsequently, the operation in the case of charging from one of the terminal 11 for the external power adaptor and the terminal 12 for the holder upon charging in the charging circuit according to the second embodiment will be described.

In the charging circuit, in the case of charging by using the terminal 11 for the external power adaptor, the current of the external power voltage is inputted from the terminal 11a. The inputted current of the external power voltage is supplied to the emitter of the pnp-type transistor Q1 and the Q1 voltage detecting circuit 21. Therefore, the Q1 voltage detecting circuit 21 detects the power voltage of the input electrode portion of the pnp-type transistor Q1. A detection result is sent to the switching signal generating circuit 24.

The switching signal generating circuit 24 generates the switching signal according to the detection result. The generated switching signal is sent to the switching circuit 25. The switching circuit 25 supplies a current to the base of the pnp-type transistor Q1 by the switching signal from the switching signal generating circuit 24. Thus, the circuit between the emitter and the collector of the pnp-type transistor Q1 is turned on, that is, made conductive, and the secondary battery E1 is charged via the resistor R1.

In the case of charging by using the terminal 12 for the holder, the current of the external power voltage is inputted from the terminal 12a. The inputted current of the external power voltage is supplied to the emitter of the pnp-type transistor Q2 and the Q2 voltage detecting circuit 22. Therefore, the Q2 voltage detecting circuit 22 detects the power voltage of the input electrode portion of the pnp-type transistor Q2. A detection result is sent to the switching signal generating circuit 24.

The switching signal generating circuit 24 generates the switching signal according to the detection result. The generated switching signal is sent to the switching circuit 25. The switching circuit 25 supplies a current to the base of the pnp-type transistor Q2 by the switching signal from the switching signal generating circuit 24. Thus, the circuit between the emitter and the collector of the pnp-type transistor Q2 is turned on, that is, made conductive, and the secondary battery E1 is charged via the resistor R1.

During the charge of the secondary battery E1, the apparatus is controlled so as to operate safely by the charge power stabilizing circuit and the control circuit 23. That is, the current across the resistor R1 is measured by the current detecting circuit 26 and the measurement result is sent to the constant current detecting circuit 28. When the constant current detecting circuit 28 detects the constant current from the measurement result, it generates a constant current detection signal. The measurement result of the current detecting circuit 26 also is sent to the charge stop detecting circuit 27. When the charge stop detecting circuit 27 detects the full charge or the like of the secondary battery from the measurement result, it generates a charge stop signal.

Those constant current detection signal and charge stop signal are sent to the control circuit 23. The constant voltage detecting circuit 29 detects a constant voltage from both ends of the secondary battery E1. When the constant voltage is detected, the constant voltage detecting circuit 29 generates a constant voltage detection signal. The constant voltage detection signal is sent to the control circuit 23. On the basis of those signals, the control circuit 23 controls the inputted voltage and current of the external power source so as to enter the optimum charging state.

If the voltage or current of the charging power source is equal to a value other than the specified value or the charge stop signal is sent from the charge stop detecting circuit 27, the control circuit 23 sends a control signal to the switching circuit 25. The switching circuit 25 which received the control signal stops the supply of the base currents to the pnp-type transistors Q1 and Q2, thereby stopping the charge to the secondary battery E1.

As described above, in the charging circuit according to the second embodiment, in the case of charging by using the terminal 11 for the external power adaptor, the pnp-type transistor Q1 is turned on, the circuit between the emitter and the collector of the pnp-type transistor Q1 is made conductive, and the current of the power voltage is inputted to the resistor R1 and the collector of the pnp-type transistor Q2. At this time, since no base current flows in the pnp-type transistor Q2, the pnp-type transistor Q2 is turned off, and since the voltage that is inputted to the pnp-type transistor Q2 is also the backward voltage, it is possible to prevent the current from flowing in the terminal 12a.

Similarly, in the case of charging by using the terminal 12 for the holder, the pnp-type transistor Q2 is turned on, the circuit between the emitter and the collector of the pnp-type transistor Q2 is made conductive, and the current of the power voltage is inputted to the resistor R1 and the collector of the pnp-type transistor Q1. At this time, since no base current flows in the pnp-type transistor Q1, the pnp-type transistor Q1 is turned off, and since the voltage that is inputted to the pnp-type transistor Q1 is also the backward voltage, it is possible to prevent the current from flowing in the terminal 11a.

Since the transistor is used as a semiconductor device for preventing the current from the input terminal for charging from being outputted from the other input terminal for charging, the voltage drop is smaller than that in the case of using the diode. Therefore, loss of voltage in the charging circuit can be reduced and charging efficiency is improved. Although the operation in the case of charging from one of the charging input terminals of the terminal 11 for the external power adaptor and the terminal 12 for the holder upon charging has been described in the second embodiment, there is also a case of actually charging from both of the charging input terminals. In such a case, upon generation of the switching signal mentioned above, a priority is allocated, as will be explained in the following embodiments, and only one of the power sources is used in accordance with the priority, so that heat generation or the like due to the overcurrent is prevented and the safety of the charging apparatus can be held.

The charging apparatus according to the third embodiment of the invention will be described. It is assumed hereinbelow that in the charging apparatus according to each of the third to sixth embodiments, the charging power sources are selectively controlled in accordance with a predetermined priority if the power sources are inputted from the two charging input terminals. Since the case where there the power source is inputted from one of the charging input terminals has already been described in the foregoing second embodiment, its explanation in the subsequent embodiments is omitted here.

Figure 7:
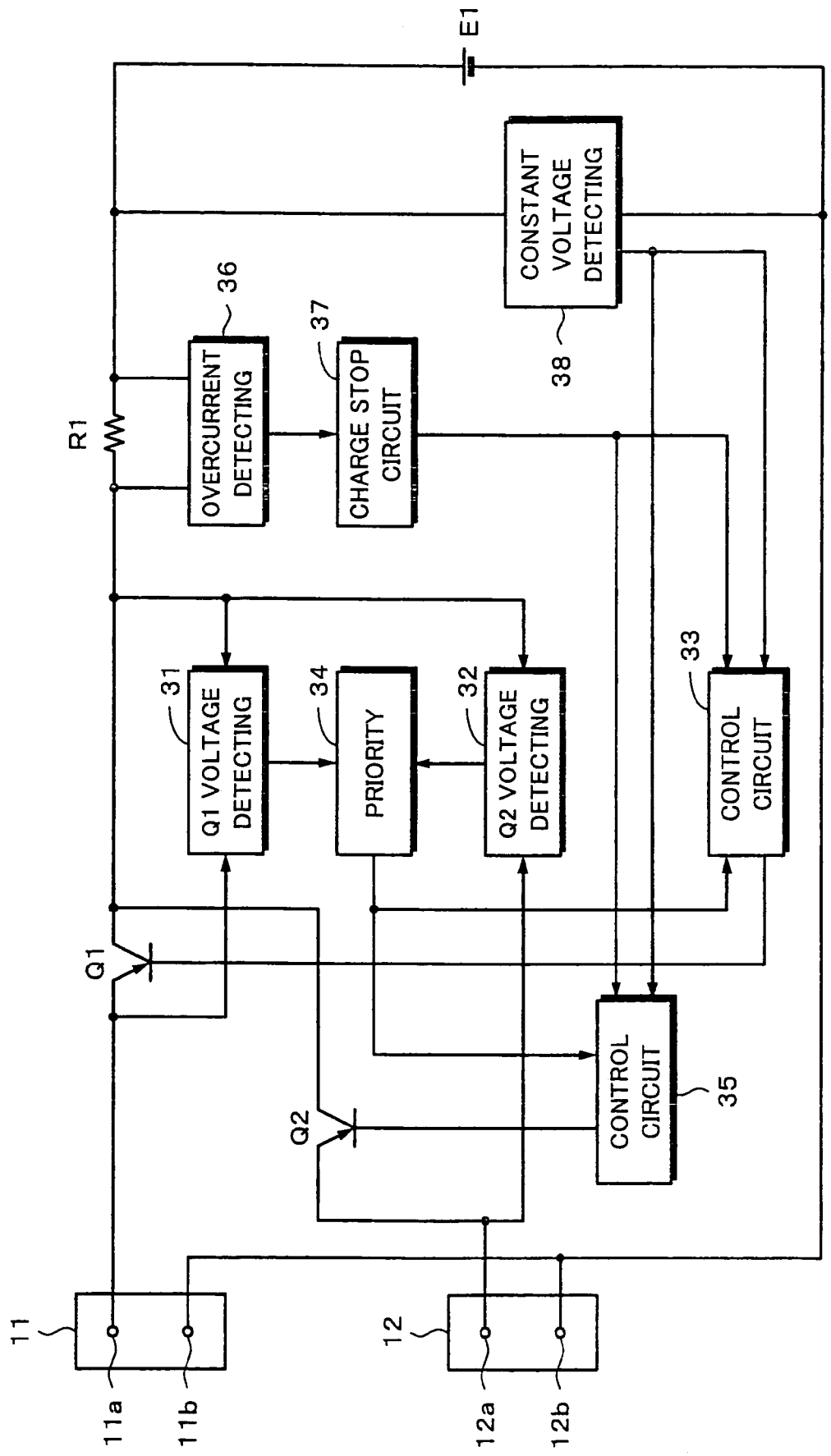
FIG. 7 is a block diagram showing an example of a charging circuit according to the third embodiment of the invention.

FIG. 7 is a diagram showing an example of a charging circuit according to the third embodiment of the invention. In the charging circuit according to the third embodiment, control circuits for the pnp-type transistors Q1 and Q2 are constructed as follows. A Q1 voltage detecting circuit 31 is connected to both ends on the emitter side and the collector side of the pnp-type transistor Q1 and is a circuit which can detect the voltage of the power source that is inputted from those ends to the pnp-type transistor Q1. A Q2 voltage detecting circuit 32 is connected to both ends on the emitter side and the collector side of the pnp-type transistor Q2 and is a circuit which can detect the voltage of the power that which is inputted from those ends to the pnp-type transistor Q2.

The Q1 voltage detecting circuit 31 and the Q2 voltage detecting circuit 32 are connected to a priority circuit 34. The priority circuit 34 is a circuit having predetermined priority data such that when the charging operation is executed by using both the terminal 11 for the external power adaptor and the terminal 12 for the holder, one of them is preferentially used. The priority circuit 34 is a circuit such that if the power voltages are detected from both of the Q1 voltage detecting circuit 31 and the Q2 voltage detecting circuit 32, a control signal corresponding to the priority is generated. When the power voltage is detected only from either the Q1 voltage detecting circuit 31 or the Q2 voltage detecting circuit 32, the priority circuit 34 preferentially selects the detected one. The priority circuit 34 is connected to control circuits 33 and 35.

The control circuit 33 is connected to the base of the pnp-type transistor Q1 and is a circuit for supplying the base current to the pnp-type transistor Q1 and switching the on/off operations of the pnp-type transistor Q1 on the basis of the control signal that is received from the priority circuit 34. The control circuit 35 is connected to the base of the pnp-type transistor Q2 and is a circuit for supplying the base current to the pnp-type transistor Q2 and switching the on/off operations of the pnp-type transistor Q2 on the basis of the control signal that is received from the priority circuit 34. In other words, the control circuit 33 is the circuit such that if it is determined from the control signal from the priority circuit 34 that the priority of the pnp-type transistor Q1 is higher than that of the pnp-type transistor Q2, the base current is supplied to the pnp-type transistor Q1, thereby turning on the pnp-type transistor Q1. If it is determined that the priority of the pnp-type transistor Q2 is higher than that of the pnp-type transistor Q1, the base current is supplied to the pnp-type transistor Q2, thereby turning on the pnp-type transistor Q2.

An overcurrent detecting circuit 36, a charge stop circuit 37, and a constant voltage detecting circuit 38 construct what is called a charge power stabilizing circuit of the charging circuit. The overcurrent detecting circuit 36 is connected to both ends of the resistor R1 and is a circuit for detecting an overcurrent from those ends. The overcurrent detecting circuit 36 is also connected to the charge stop circuit 37.

The charge stop circuit 37 is a circuit for generating a charge stop signal when the overcurrent is detected by the overcurrent detecting circuit 36. The constant voltage detecting circuit 38 is a circuit for detecting the constant voltage across the secondary battery E1. The charge stop circuit 37 and the constant voltage detecting circuit 38 are connected to the control circuits 33 and 35. In the embodiment, an explanation regarding the current detecting circuit, charge stop circuit, constant current detecting circuit, and constant voltage detecting circuit 38 as a circuit for stabilizing the charge power source and an explanation regarding the operations of those circuits are omitted.

In the charging circuit according to the third embodiment, the operation in the case where the external power source is inputted from the input terminals of both the terminal 11 for the external power adaptor and the terminal 12 for the holder upon charging will be explained.

In the charging circuit, in the case of charging by using the terminal 11 for the external power adaptor and the terminal 12 for the holder, the currents of the external power voltages are inputted from the terminals 11a and 12a. The current of the external power voltage inputted from the terminal 11a flows in the pnp-type transistor Q1 and the Q1 voltage detecting circuit 31. Therefore, the Q1 voltage detecting circuit 31 detects the power voltage of the input electrode portion of the pnp-type transistor Q1. The current of the external power voltage inputted from the terminal 12a flows in the pnp-type transistor Q2 and the Q2 voltage detecting circuit 32. Therefore, the Q2 voltage detecting circuit 32 detects the power voltage of the input electrode portion of the pnp-type transistor Q2. Detection results of the Q1 voltage detecting circuit 31 and the Q2 voltage detecting circuit 32 are sent to the priority circuit 34.

When the priority circuit 34 receives the voltage detection signals from both the Q1 voltage detecting circuit 31 and the Q2 voltage detecting circuit 32, it generates an ON signal on the basis of the preset priority. The generated ON signal is sent to the control circuit 33 or 35. For example, if the apparatus has been set so as to preferentially select the pnp-type transistor Q1, the ON signal is sent to the control circuit 33.

When the control circuits 33 and 35 receive the ON signal from the priority circuit 34, they supply the base currents to the pnp-type transistors Q1 and Q2, respectively. Thus, the circuit between the emitter and the collector of the transistor having the higher priority is turned on, that is, made conductive, and the secondary battery E1 is charged via the resistor R1. When the control circuits 33 and 35 receive the charge stop signal or the like during the charge, they immediately stop the supply of the base currents, thereby stopping the charge of the secondary battery E1.

As described above, in the charging circuit according to the third embodiment, in the case of inputting the external power sources from both the terminal 11 for the external power adaptor and the terminal 12 for the holder and charging, the transistor whose preset priority is higher between the pnp-type transistors Q1 and Q2 is turned on, the circuit between the emitter and the collector of such a transistor is made conductive, and the current of the power voltage is inputted to the resistor R1 and the collector of the other transistor. At this time, since no base current flows in the other transistor, the other transistor is turned off. Since the voltage that is inputted to the other transistor is also the backward voltage, it is possible to prevent the current from flowing from the other transistor.

Since the transistor is used as a semiconductor device for preventing the current from the input terminal for charging from being outputted from the other input terminal for charging, the voltage drop is smaller than that in the case of using a diode. Therefore, loss of voltage in the charging circuit can be reduced and charging efficiency is improved.

Even if the external power sources are inputted from both the terminal 11 for the external power adaptor and the terminal 12 for the holder upon charging, since the apparatus can be controlled so as to selectively use only the preset one of the external power sources, the heat generation or the like due to the overcurrent can be prevented and the safety of the charging apparatus can be maintained.

Subsequently, a charging apparatus according to the fourth embodiment of the invention will be described. In the charging apparatus according to the fourth embodiment, when the power sources are inputted from the two input terminals for charging, the external power source in which the predetermined voltage value has been detected first is selectively used.

Figure 8:
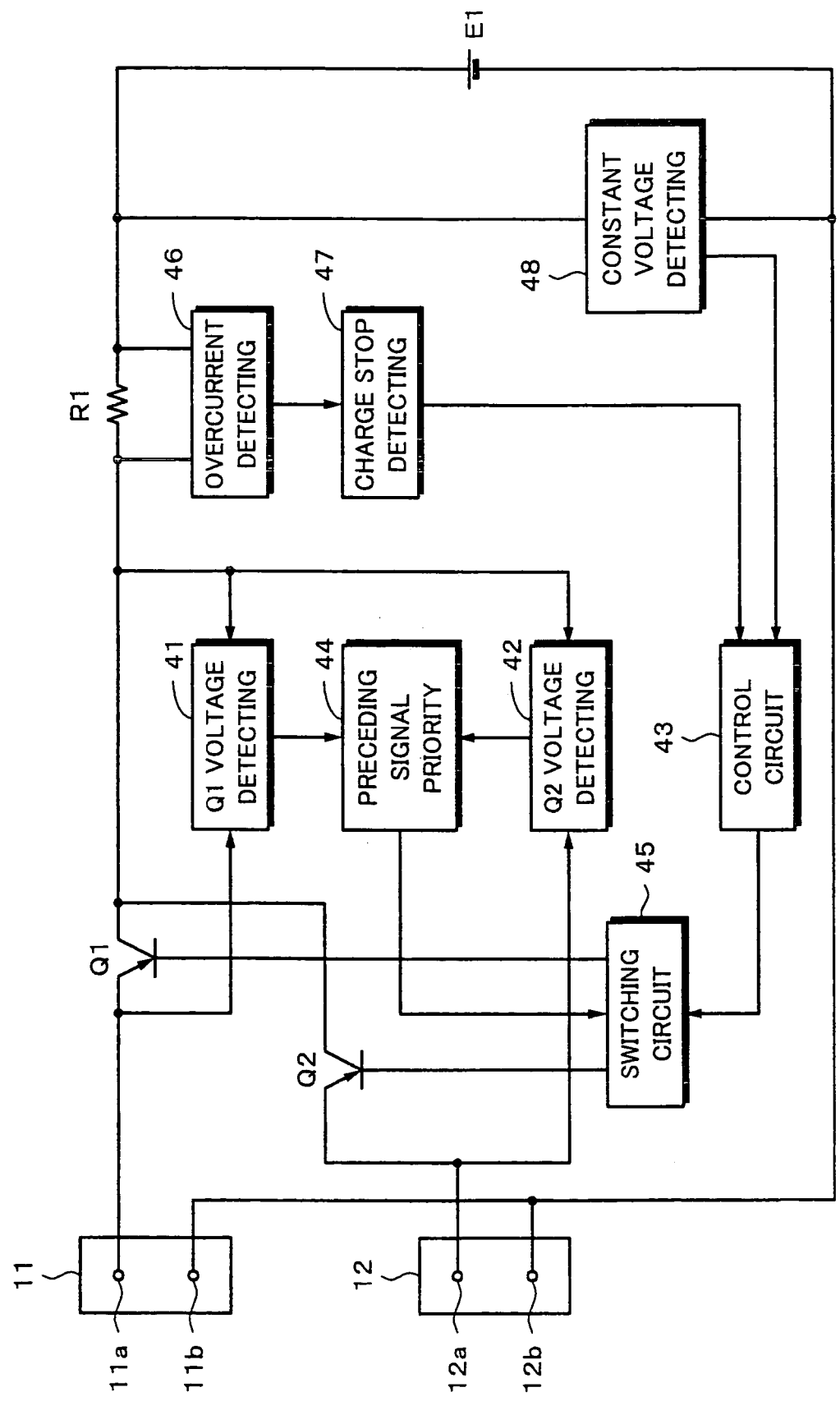
FIG. 8 is a block diagram showing an example of a charging circuit according to the fourth embodiment of the invention.

FIG. 8 is a diagram showing an example of a charging circuit according to the fourth embodiment of the invention. In the charging circuit according to the fourth embodiment, a control circuit for the pnp-type transistors Q1 and Q2 is constructed as follows. A Q1 voltage detecting circuit 41 is connected to both ends on the emitter side and the collector side of the pnp-type transistor Q1 and is a circuit, which can detect the voltage of the external power source that is inputted from those ends to the pnp-type transistor Q1. A Q2 voltage detecting circuit 42 is connected to both ends on the emitter side and the collector side of the pnp-type transistor Q2 and is a circuit, which can detect the voltage of the external power source that is inputted from those ends to the pnp-type transistor Q2.

The Q1 voltage detecting circuit 41 and the Q2 voltage detecting circuit 42 are connected to a preceding signal priority circuit 44. The preceding signal priority circuit 44 is a circuit for setting the priority of the external power source on the side where a predetermined voltage has been detected first to be higher and generating a switching signal corresponding to the higher priority. In the case of charging a cellular phone, for example, the apparatus is set so that the priority of the external power source on the side where the voltage of 200 mV or more has been detected first is set to be higher, or the like. If the voltage is detected only from one of the Q1 voltage detecting circuit 41 and the Q2 voltage detecting circuit 42, the power source of the voltage detecting circuit on the side where the voltage has been detected is preferentially used. The preceding signal priority circuit 44 are connected to a switching circuit 45.

The switching circuit 45 is connected to the base of the pnp-type transistor Q1 and the base of the pnp-type transistor Q2 and is a circuit for supplying a current to the base of the pnp-type transistor Q1 or the base of the pnp-type transistor Q2 and switching the on/off operations of the pnp-type transistor Q1 or Q2 on the basis of the switching signal that is received from the preceding signal priority circuit 44.

The switching circuit 45 is connected to a control circuit 43. Since the control circuit 43 and the circuits for stabilizing the charge power source, such as, the overcurrent detecting circuit 46, the charge stop circuit 47, the constant voltage detecting circuit 48, and the like have already been described in the second and third embodiments, their explanation is omitted here.

In the charging circuit according to the fourth embodiment, subsequently, the operation in the case of inputting the external power source to the input terminals of both the terminal 11 for the external power adaptor and the terminal 12 for the holder upon charging will be described.

In the charging circuit, in the case of charging by using the terminal 11 for the external power adaptor and the terminal 12 for the holder, the currents of the external power voltages are inputted from the terminals 11a and 12a. The current of the external power voltage inputted from the terminal 11a flows in the pnp-type transistor Q1 and the Q1 voltage detecting circuit 41. Therefore, the Q1 voltage detecting circuit 41 detects the power voltage of the input electrode portion of the pnp-type transistor Q1.

The current of the external power voltage inputted from the terminal 12a flows in the pnp-type transistor Q2 and the Q2 voltage detecting circuit 42. Therefore, the Q2 voltage detecting circuit 42 detects the power voltage of the input electrode portion of the pnp-type transistor Q2. Detection results of the Q1 voltage detecting circuit 41 and the Q2 voltage detecting circuit 42 are sent to the preceding signal priority circuit 44.

When the preceding signal priority circuit 44 receives the signals of the voltage detection from both of the Q1 voltage detecting circuit 41 and the Q2 voltage detecting circuit 42, it preferentially selects the external power source on the side where the voltage of the predetermined voltage value or more has been detected first and generates the switching signal on the basis of the priority. The generated switching signal is sent to the switching circuit 45.

The switching circuit 45 supplies current to the base of the pnp-type transistor Q1 or the base of the pnp-type transistor Q2 on the basis of the switching signal from the preceding signal priority circuit 44. Thus, the circuit between the emitter and the collector of the transistor of the higher priority is turned on, that is, made conductive, and the secondary battery E1 is charged via the resistor R1.

As described above, in the charging circuit according to the fourth embodiment, if the external power sources are inputted from both the terminal 11 for the external power adaptor and the terminal 12 for the holder and charged, the transistor on the side where the predetermined voltage value has been detected first between the pnp-type transistors Q1 and Q2 is turned on, the circuit between the emitter and the collector of such a transistor is made conductive, and the current of the power voltage is inputted to the resistor R1 and the collector of the other transistor. At this time, since no base current flows in the other transistor, the other transistor is turned off. Since the voltage that is inputted is also the backward voltage, it is possible to prevent the current from flowing from the other transistor. Since the transistor is used as a semiconductor device for preventing the current from the input terminal for charging from being outputted from the other input terminal for charging, the voltage drop is smaller than that in the case of using a diode. Therefore, the loss of voltage in the charging circuit can be reduced and the charging efficiency is improved.

Even if the external power sources are inputted from both the terminal 11 for the external power adaptor and the terminal 12 for the holder upon charging, since it is possible to control the apparatus in a manner such that only the external power source on the side where the power voltage has been detected first is selectively used, the heat generation due to the overcurrent is prevented and the safety of the charging apparatus can be held.

A charging apparatus according to the fifth embodiment of the invention will now be described. In the charging apparatus according to the fifth embodiment, when the power sources are inputted from the two input terminals for charging, the safer external input power source is higher and is selectively used.

Figure 9:
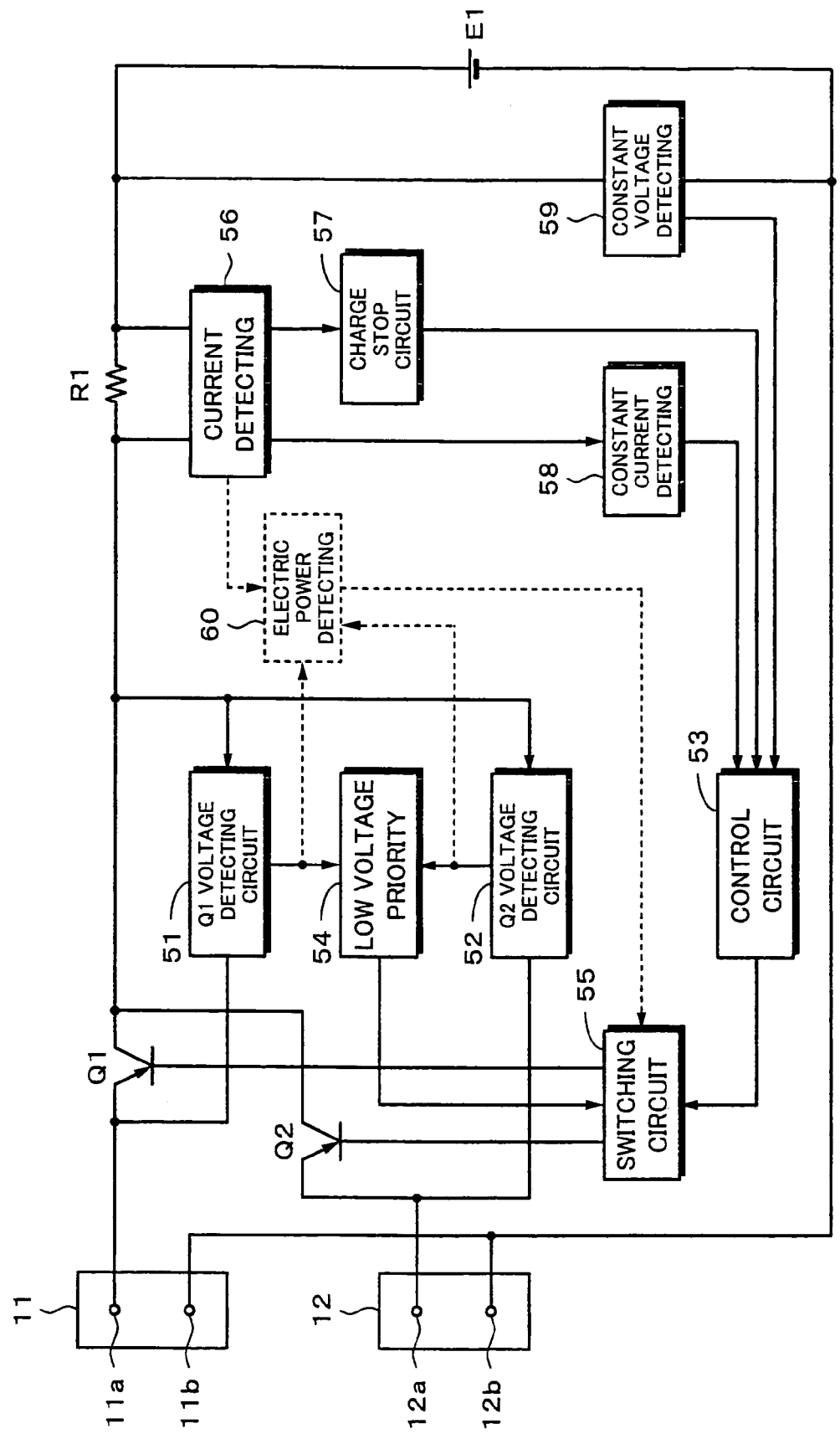
FIG. 9 is a block diagram showing an example of a charging circuit according to the fifth embodiment of the invention.

FIG. 9 is a diagram showing an example of a charging circuit according to the fifth embodiment of the invention. In the charging circuit according to the fifth embodiment, a control circuit for the pnp-type transistors Q1 and Q2 is constructed as follows. A Q1 voltage detecting circuit 51 is connected to both ends on the emitter side and the collector side of the pnp-type transistor Q1 and is a circuit which can detect the voltage of the external power source that is inputted from those ends to the pnp-type transistor Q1. A Q2 voltage detecting circuit 52 is connected to both ends on the emitter side and the collector side of the pnp-type transistor Q2 and is a circuit which can detect the voltage of the external power source that is inputted from those ends to the pnp-type transistor Q2.

The Q1 voltage detecting circuit 51 and the Q2 voltage detecting circuit 52 are connected to a low voltage priority circuit 54. The low voltage priority circuit 54 is a circuit for setting the priority of the external power source on the side where the power voltage is equal to or larger than a specified minimum input voltage value and the voltage is lower to be higher and generating a switching signal corresponding to the higher priority. For example, when the specified input voltage value is equal to 280 mV, if the two external power sources of 500 mV and 300 mV are inputted, the low voltage priority circuit 54 referentially selects the power voltage of 300 mV. If the voltage is detected only from one of the Q1 voltage detecting circuit 51 and the Q2 voltage detecting circuit 52, the external power source on the side where the voltage has been detected is preferentially used. The low voltage priority circuit 54 is connected to a switching circuit 55.

The switching circuit 55 is connected to the base of the pnp-type transistor Q1 and the base of the pnp-type transistor Q2 and is a circuit for supplying a current to the base of the pnp-type transistor Q1 or the base of the pnp-type transistor Q2 and switching the on/off operations of the pnp-type transistor Q1 or Q2 on the basis of the switching signal from the low voltage priority circuit 54. The switching circuit 55 is connected to a control circuit 53. Since the control circuit 53 and circuits for stabilizing the charge power source, such as current detecting circuit 56, a charge stop circuit 57, a constant current detecting circuit 58, a constant voltage detecting circuit 59, and the like have already been described in the second and third embodiments, their explanation is omitted here.

In the charging circuit according to the fifth embodiment, subsequently, the operation in the case of inputting the external power sources from the input terminals of both the terminal 11 for the external power adaptor and the terminal 12 for the holder upon charging will be described.

In the charging circuit, in the case of charging by using the terminal 11 for the external power adaptor and the terminal 12 for the holder, the currents of the external power voltages are inputted from the terminals 11a and 12a. The current of the external power voltage inputted from the terminal 11a flows in the emitter of the pnp-type transistor Q1 and the Q1 voltage detecting circuit 51. Therefore, the Q1 voltage detecting circuit 51 detects the power voltage of the input electrode portion of the pnp-type transistor Q1.

The current of the external power voltage inputted from the terminal 12a flows in the emitter of the pnp-type transistor Q2 and the Q2 voltage detecting circuit 52. Therefore, the Q2 voltage detecting circuit 52 detects the power voltage of the input electrode portion of the pnp-type transistor Q2. The detection results of the Q1 voltage detecting circuit 51 and the Q2 voltage detecting circuit 52 are sent to the low voltage priority circuit 54.

When the low voltage priority circuit 54 receives the signals of the voltage detection from both the Q1 voltage detecting circuit 51 and the Q2 voltage detecting circuit 52, it preferentially selects the external power source on the side where the value of the detected voltage is equal to or larger than the specified minimum input voltage value and the voltage is lower. The low voltage priority circuit 54 generates a switching signal on the basis of the priority. The generated switching signal is sent to the switching circuit 55.

The switching circuit 55 supplies the current to the base of the pnp-type transistor Q1 or the base of the pnp-type transistor Q2 on the basis of the switching signal from the low voltage priority circuit 54. Thus, the circuit between the emitter and the collector of the transistor in which the voltage is equal to or larger than the specified minimum input voltage value and the voltage is lower is turned on, that is, made conductive, and the secondary battery E1 is charged via the resistor R1.

In the embodiment, by the low voltage priority circuit 54, the priority of the external power source on the side where the power voltage that is inputted is equal to or larger than the specified minimum input voltage value and the voltage is lower is set to be higher, the heat generation or the like of the pnp-type transistors Q1 and Q2 is suppressed, and the safety of the charging circuit is improved. However, the safety of the charging circuit can be improved by setting the priority of the external power source of the lower electric power to be higher.

In such a case, an electric power detecting circuit 60 connected to the Q1 voltage detecting circuit 51, the Q2 voltage detecting circuit 52, and a current detecting circuit 56 shown by broken lines in FIG. 9 is used. The electric power detecting circuit 60 is a circuit for detecting each electric power on the basis of the detection results of the Q1 voltage detecting circuit 51 and the Q2 voltage detecting circuit 52 and a current from the current detecting circuit 56. The electric power detecting circuit 60 is also a circuit for preferentially selecting the external power source on the side where the detected electric power is smaller and generating a switching signal on the basis of the priority. If such an electric power detecting circuit is used in place of the low voltage priority circuit 54, the external power source on the side where the detected electric power is smaller can be used selectively.

As described above, in the charging circuit according to the fifth embodiment, if the external power sources are inputted from both the terminal 11 for the external power adaptor and the terminal 12 for the holder and charged, the transistor on the side where the power voltage is equal to or larger than the specified minimum input voltage value and the voltage is lower between the pnp-type transistors Q1 and Q2 is turned on, the circuit between the emitter and the collector of such a transistor is made conductive, and the current of the power voltage is inputted to the resistor R1 and the collector of the other transistor. At this time, since no base current flows in the other transistor, the other transistor is turned off. Since the voltage that is inputted is also the backward voltage, it is possible to prevent the current from flowing from the other transistor. Since the transistor is used as a semiconductor device for preventing the current from the input terminal for charging from being outputted from the other input terminal for charging, the voltage drop is smaller than that in the case of using a diode. Therefore, the loss of voltage in the charging circuit can be reduced and the charging efficiency is improved.

Even if the external power sources are inputted from both the terminal 11 for the external power adaptor and the terminal 12 for the holder upon charging, since it is possible to control the apparatus in a manner such that only the safer external power source is selectively used, the heat generation due to the overcurrent is prevented and the safety of the charging apparatus can be held.

Figure 10:
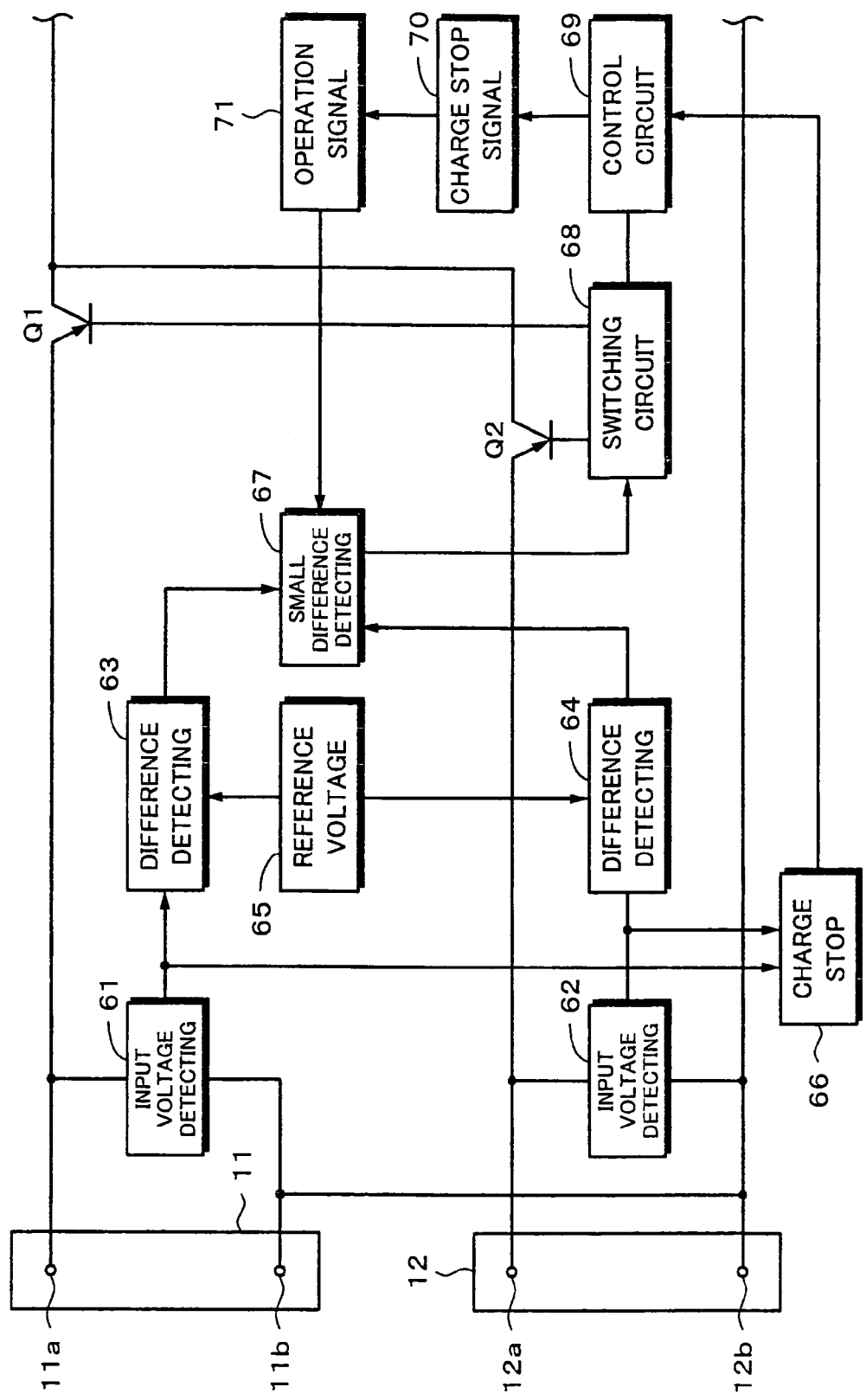
FIG. 10 is a block diagram showing an example of a charging circuit according to the sixth embodiment of the invention.

A charging apparatus according to the sixth embodiment of the invention will now be described. In the charging apparatus according to the sixth embodiment, when the power sources are inputted from the two input terminals for charging, the external power source on the side where the voltage of the external power source that is inputted is closer to an input reference voltage is selectively used. FIG. 10 is a diagram showing an example of a charging circuit according to the sixth embodiment of the invention. Since the charge power stabilizing circuit, the secondary battery, and the like have already been described in the foregoing second and third embodiments, their explanation is omitted here. In the charging circuit according to the sixth embodiment, a control circuit for the pnp-type transistors Q1 and Q2 is constructed as follows.

An input voltage detecting circuit 61 is connected between the terminal 11a as a plus electrode and the terminal 11b as a minus electrode of the terminal 11 for the external power adaptor and is a circuit which can detect the voltage of the external power source that is inputted between the terminal 11 for the external power adaptor. An input voltage detecting circuit 62 is connected to the terminal 12a as a plus electrode and the terminal 12b as a minus electrode of the terminal 12 for the holder and is a circuit which can detect the voltage of the external power source that is inputted to the terminal 12 for the holder.

The input voltage detecting circuit 61 is connected to a difference detecting circuit 63 and a charge stop circuit 66. The input voltage detecting circuit 62 is connected to a difference detecting circuit 64 and the charge stop circuit 66. The charge stop circuit 66 is connected to a control circuit 69 and is a circuit for generating a control signal to stop the charge on the basis of detection results of the input voltage detecting circuits 61 and 62.

The difference detecting circuits 63 and 64 are connected to a reference voltage circuit 65. The reference voltage circuit 65 is a circuit in which a reference voltage (hereinafter, referred to as a reference input voltage value) as an ideal voltage of the external input power source that has been preset has been stored. The difference detecting circuit 63 is a circuit for detecting a difference between the reference input voltage value of the reference voltage circuit 65 and an input voltage detected by the input voltage detecting circuit 61. The difference detecting circuit 64 is a circuit for detecting a difference between the reference input voltage value of the reference voltage circuit 65 and an input voltage detected by the input voltage detecting circuit 62.

The difference detecting circuits 63 and 64 are connected to a small difference detecting circuit 67. The small difference detecting circuit 67 is a circuit for comparing the difference calculated in the difference detecting circuit 63 and the difference calculated in the difference detecting circuit 64, setting the priority of the external power source on the side where the difference is smaller to be high, and generating a switching signal corresponding to such a priority. The small difference detecting circuit 67 is connected to a switching circuit 68.

The switching circuit 68 is connected to the base of the pnp-type transistor Q1 and the base of the pnp-type transistor Q2 and is a circuit for supplying a current to the base of the pnp-type transistor Q1 or the base of the pnp-type transistor Q2 and switching the on/off operations of the pnp-type transistor Q1 or Q2 on the basis of the switching signal from the small difference detecting circuit 67.

The control circuit 69 is connected to a charge stop signal generating circuit 70 and the switching circuit 68. The charge stop signal generating circuit 70 is a circuit for generating a charge stop signal on the basis of a control signal from the control circuit 69. The charge stop signal is a signal showing that the apparatus is in a charge stop state. The charge stop signal generating circuit 70 is connected to an operation signal generating circuit 71. When the charge stop signal is sent from the charge stop signal generating circuit 70, the operation signal generating circuit 71 generates an operation signal. The operation signal generating circuit 71 is connected to the small difference detecting circuit 67.

In the charging circuit according to the sixth embodiment, subsequently, the operation in the case where the external power sources are inputted from the input terminals of both the terminal 11 for the external power adaptor and the terminal 12 for the holder upon charging will be described.

In the charging circuit, in the case of charging by using the terminal 11 for the external power adaptor and the terminal 12 for the holder, the currents of the external power voltages are inputted from the terminals 11a and 12a. The current of the external power voltage inputted from the terminal 11a flows in the emitter of the pnp-type transistor Q1 and the input voltage detecting circuit 61. Therefore, the input voltage detecting circuit 61 detects the external power voltage that is inputted to the terminal 11 for the external power adaptor.

The current of the external power voltage inputted from the terminal 12a flows in the emitter of the pnp-type transistor Q2 and the input voltage detecting circuit 62. Therefore, the input voltage detecting circuit 62 detects the external power voltage that is inputted from the terminal 12 for the holder. A detection result of the input voltage detecting circuit 61 is sent to the difference detecting circuit 63 and the charge stop circuit 66. A detection result of the input voltage detecting circuit 62 is sent to the difference detecting circuit 64 and the charge stop circuit 66.

In each of the difference detecting circuits 63 and 64, the difference between the detected input voltage and the reference voltage from the reference voltage circuit 65 is detected. Each detection result is sent to the small difference detecting circuit 67.

The small difference detecting circuit 67 is made operative by the operation signal from the operation signal generating circuit 71. That is, when the detection signals are sent to the charge stop circuit 66 from both of the input voltage detecting circuits 61 and 62, the charge stop circuit 66 transmits a signal for stopping the charge to the control circuit 69. When the control circuit 69 receives the charge stop signal, it sends a switching signal for stopping the charge to the switching circuit 68, thereby stopping the charge to the secondary battery E1.

The control circuit 69 sends a signal indicative of the charge stop state to the charge stop signal generating circuit 70 when the charge is stopped. When the charge stop signal generating circuit 70 receives such a signal, it generates the charge stop signal and sends it to the operation signal generating circuit 71. When the operation signal generating circuit 71 receives the charge stop signal, it generates an operation signal and sends it to the small difference detecting circuit 67. Thus, the small difference detecting circuit 67 is made operative.

In the small difference detecting circuit 67, the external power source on the side where the difference is smaller, that is, the power source on the side where the voltage is close to the reference voltage, is preferentially selected, and the switching signal is generated on the basis of the priority. The switching signal is sent to the switching circuit 68.

The switching circuit 68 supplies a current to the base of the pnp-type transistor Q1 or the base of the pnp-type transistor Q2 on the basis of the switching signal from the small difference detecting circuit 67. Thus, the circuit between the emitter and the collector of the transistor to which the external power source that is closer to the reference voltage is inputted is turned on, that is, is made conductive, and the secondary battery is charged.

As described above, in the charging circuit according to the sixth embodiment, in the case where the external power sources are inputted from both the terminal 11 for the external power adaptor and the terminal 12 for the holder and the charge is executed, the transistor on the side where the external voltage which is closer to the reference input voltage between the pnp-type transistors Q1 and Q2 is inputted is turned on. The circuit between the emitter and the collector of such a transistor is made conductive, and the current of the power voltage is inputted to the collector of the other transistor and the secondary battery (not shown). At this time, since no base current flows in the other transistor, the other transistor is turned off. Since the voltage that is inputted is also the backward voltage, it is possible to prevent the current from flowing from the other transistor.

Since the transistor is used as a semiconductor device for preventing the current from the input terminal for charging from being outputted from the other input terminal for charging, the voltage drop is smaller than that in the case of using a diode. Therefore, the loss of voltage in the charging circuit can be reduced and the charging efficiency is improved.

Even if the external power sources are inputted from both the terminal 11 for the external power adaptor and the terminal 12 for the holder upon charging, since the apparatus can be controlled so as to selectively use only the external power source which is closer to the reference input voltage, the heat generation or the like due to the overcurrent can be prevented and the safety of the charging apparatus can be held.

Subsequently, a charging apparatus according to the seventh embodiment of the invention will be described. According to the charging apparatus of the seventh embodiment, when the external power sources are inputted from the two input terminals for charging, if the total current of the two inputs is equal to or less than a reference value, the charge is performed from both the external power sources, and if the total current of the two inputs exceeds the reference value, the charge is performed from only one of the external power sources.

FIG. 11 is a diagram showing an example of a charging circuit according to the seventh embodiment of the invention. In the charging circuit according to the seventh embodiment, control circuits for the pnp-type transistors Q1 and Q2 are constructed as follows.

A current detecting circuit 77 and an overcurrent detecting circuit 76 are connected to both ends of the resistor R1. The current detecting circuit 77 is a circuit for detecting the charge current to the secondary battery E1. The overcurrent detecting circuit 76 is also connected to both ends of the resistor R1. The overcurrent detecting circuit 76 is a circuit for detecting an overcurrent to the secondary battery.

The current detecting circuit 77 is connected to an operation switching circuit 74. The operation switching circuit 74 is a circuit for discriminating whether the operation is switched to only one operation or not on the basis of a detection result of the current detecting circuit 77. The operation switching circuit 74 is connected to a one-operation stop circuit 75. The one-operation stop circuit 75 is a circuit for generating a control signal on the basis of a discrimination result that is supplied from the operation switching circuit 74 and shows whether one of the operations is stopped or not. The one-operation stop circuit 75 is connected to an operation detecting circuit 78 and is a circuit for transmitting an operation signal to the operation detecting circuit 78 during the operation of the one-operation stop circuit 75. The operation detecting circuit 78 is connected to the overcurrent detecting circuit 76 and is a circuit for controlling the operation of the overcurrent detecting circuit 76 on the basis of a detection result of the operation detection signal.

The overcurrent detecting circuit 76 is connected to an operation stop circuit 79 and is a circuit for transmitting an operation signal to the operation stop circuit 79 during the operation of the overcurrent detecting circuit 76. The operation stop circuit 79 is connected to control circuits 72 and 73, detects the operation signal from the overcurrent detecting circuit 76, and sends the operation stop control signal to the control circuits 72 and 73.

The one-operation stop circuit 75 is connected to the control circuits 72 and 73 and is a circuit for transmitting a control signal for turning off one of the pnp-type transistors Q1 and Q2 to the control circuit 72 or 73. The control circuit 72 is connected to the base of the pnp-type transistor Q1 and is a circuit for controlling the base current to the pnp-type transistor Q1 and switching the on/off operations of the pnp-type transistor Q1 on the basis of the control signal. The control circuit 73 is connected to the base of the pnp-type transistor Q2 and is a circuit for controlling the base current to the pnp-type transistor Q2 and switching the on/off operations of the pnp-type transistor Q2 on the basis of the control signal.

A constant voltage detecting circuit 80 is connected to both ends of the secondary battery E1. The constant voltage detecting circuit 80 is connected to the control circuits 72 and 73 and is a circuit for detecting a constant voltage from the voltage to be charged and transmitting a detection result to the control circuits 72 and 73. Since the charge power stabilizing circuit (not shown) has already been described in the foregoing second and third embodiments, its explanation is omitted here. In the charging circuit according to the seventh embodiment, subsequently, the operation in the case where the external power sources are inputted from the input terminals of both the terminal 11 for the external power adaptor and the terminal 12 for the holder upon charging will be described.

In the foregoing first to sixth embodiments, before the connection of the external power sources, both of the pnp-type transistors Q1 and Q2 are always set to the OFF state, and one of them is turned on in accordance with a predetermined condition. In the seventh embodiment, before the connection of the external power sources, both of the pnp-type transistors Q1 and Q2 are always set to the ON state and one of them is turned off when the overcurrent is detected.

That is, in the charging circuit, in the case of charging by using the terminal 11 for the external power adaptor and the terminal 12 for the holder, the currents of the external power voltages are inputted from the terminals 11a and 12a. The current of the external power voltage inputted from the terminal 11a flows in the secondary battery E1 via the pnp-type transistor Q1. The current of the external power voltage inputted from the terminal 12a flows in the secondary battery E1 via the pnp-type transistor Q2.

During the charge, the charge current is detected by the current detecting circuit 77. The detected current is sent to the operation switching circuit 74 and whether the current value is equal to or larger than a reference current or not is discriminated. If it is equal to or larger than the reference current, the operation switching circuit 74 sends an operation switching signal to the one-operation stop circuit 75. On the basis of the operation switching signal, the one-operation stop circuit 75 generates a control signal for turning on only one of the pnp-type transistors Q1 and Q2.

The control signal generated by the one-operation stop circuit 75 is sent to the control circuits 72 and 73. By the control signal, the control circuits 72 and 73 supply the base current to only one of the pnp-type transistors Q1 and Q2 so as to select one of the external power sources to be charged. At this time, which one of them is preferentially used also can be determined by applying the foregoing first to sixth embodiments.

As mentioned above, the one-operation stop circuit 75 detects the operation signal from the operation switching circuit 74, and during the switching operation of the power sources, the one-operation stop circuit 75 sends the operation signal to the operation detecting circuit 78. When the operation signal is detected, the operation detecting circuit 78 sends a temporary stop signal to the overcurrent detecting circuit 76. By the temporary stop signal from the operation detecting circuit 78, the overcurrent detecting circuit 76 enters a temporary stop mode when the operation is switched to the input of only one power source. After the stop of the switching operation of the power sources, that is, when the one-operation stop circuit 75 does not detect the operation signal from the operation switching circuit 74, the one-operation stop circuit 75 stops the transmission of the operation signal to the operation detecting circuit 78 and the overcurrent detecting circuit 76 is made operative.

During the operation of the overcurrent detecting circuit 76, the overcurrent detecting circuit 76 sends the operation signal to the operation stop circuit 79 and sends the operation stop signal to the control circuits 72 and 73. By the operation stop signal, the power switching operation is stopped during the detection of the overcurrent. Thus, the power sources can be switched while protecting the pnp-type transistors Q1 and Q2 or the like. The constant voltage across the secondary battery E1 that is detected by the constant voltage detecting circuit 80 is sent to the control circuits 72 and 73. The secondary battery E1 is charged by the external power source of the voltage suitable for charging.

As described above, in the charging circuit according to the seventh embodiment, since the external power sources are inputted from both the terminal 11 for the external power adaptor and the terminal 12 for the holder and charging, it is possible to prevent the current from flowing into the outside from the charging input terminals.

If the total current of the two external power sources is equal to or less than the reference current, since the charging is performed by using both of the external power sources, the battery can be efficiently charged.

Since the transistor is used as a semiconductor device for preventing the current from the input terminal for charging from being outputted from the other input terminal for charging, the voltage drop is smaller than that in the case of using a diode. Therefore, the loss of voltage in the charging circuit can be reduced and the charging efficiency is improved.

The invention is not limited to the foregoing embodiments or the like of the invention, but many variations and modifications are possible within the scope of the invention without departing from the spirit of the invention. For example, the pnp-type transistors Q1 and Q2 are not limited to the pnp-type transistors and can be replaced with other semiconductor devices, such as FETs (Field Effect Transistors) or the like, each having an input electrode, an output electrode, and a control electrode to control the output electrode.

For instance, although the two terminals, such as terminal 11 for the external power adaptor and the terminal 12 for the holder, have been used as charging input terminals, the invention is not limited to them, but the battery can be also charged from three or more input terminals for charging.

For example, although the example of using the cellular phone as a portable electronic apparatus having the charging apparatus according to the invention has been described in the above embodiments, the invention is not limited to it, but the invention can be also applied to other apparatuses, such as a MD player, a PDA (Personal Digital Assistants), a video camera, and the like.

As described above, according to the invention, in the charging apparatus having two or more input terminals that are used for charging, by switching the on/off of the inputs of the external power sources by using a semiconductor device, such as a transistor having an input electrode, an output electrode, and a control electrode for controlling the output electrode, the secondary battery can be efficiently charged while keeping safety.

If the external power sources are inputted from a plurality of input terminals for charging, by allocating the priorities to them in consideration of the safety of the charging operation and its charging efficiency, selectively using the external power source having the higher priority, and charging the battery, the secondary battery can be efficiently charged while maintaining safety.

In the case where the external power sources are inputted from a plurality of input terminals for charging, if the total current value of the inputted external power sources is smaller than the input reference power source, the external power sources are inputted from a plurality of input terminals for charging. If the total current value is equal to or larger than the input reference power source, by selectively using the external power sources, the secondary battery can be efficiently charged while maintaining safety.

The present invention is not limited to the foregoing embodiments, but many modifications and variations are possible within the spirit and scope of the appended claims of the invention.

What is claimed is:

1. A charging apparatus comprising:
   first and second input terminals to which power voltage sources are connected;

first and second semiconductor devices for power control in which said first and second input terminals are connected to input electrodes, respectively;

a secondary battery to which output electrodes of said first and second semiconductor devices for power control are connected in common and which is connected between said common connection electric potential point and a reference electric potential point;

a control circuit for controlling a terminal voltage and a charge current of said secondary battery to desired values;

switching signal generating means for detecting voltages which are generated at the input electrodes of said first and second semiconductor devices for power control and generating a switching signal for turning on a circuit between the input and output electrodes of said semiconductor device for power control at which the voltage has been detected; and a stabilizing circuit that stabilizes the power voltage sources detects and includes at least one of an overcurrent protection circuit, a charge stop circuit, a constant current detecting circuit, and a constant voltage detection circuit, wherein if the voltages are detected from the input electrodes of both of said first and second semiconductor devices for power control, the input power sources are controlled by turning on the circuit between the input and output electrodes of one of said first and second semiconductor devices such that in accordance with a priority protocol the semiconductor device located on the side in which the voltage is equal to or larger than a predetermined minimum voltage value is selected.

* * * * *